(12) United States Patent
Rapp (10) Patent No.: US 7,206,794 B2
(45) Date of Patent: Apr. 17, 2007

(54) METHODS, COMPUTER SYSTEMS AND SOFTWARE APPLICATIONS FOR PROVIDING A LOCK SERVICE

(75) Inventor: Roman Rapp, Villeneuve Loubot (FR)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/292,063

(22) Filed: Dec. 2, 2005

(65) Prior Publication Data
US 2006/0123065 A1 Jun. 8, 2006

Related U.S. Application Data

(60) Provisional application No. 60/632,526, filed on Dec. 3, 2004.

(30) Foreign Application Priority Data
Jan. 25, 2005 (EP) ................... 05100456

(51) Int. Cl.
*G06F 12/00* (2006.01)
*G06F 7/00* (2006.01)
(52) U.S. Cl. .................... 707/200; 707/201
(58) Field of Classification Search .............. 707/1, 707/9, 10, 8, 200, 201, 203; 717/170
See application file for complete search history.

(56) References Cited

U.S. PATENT DOCUMENTS 5,485,607 A 1/1996 Lomet et al.
5,983,225 A * 11/1999 Anfindsen .................. 707/8
6,216,207 B1 4/2001 Miller et al.
6,418,438 B1 7/2002 Campbell
2004/0187121 A1* 9/2004 Barth et al. ............... 718/100

FOREIGN PATENT DOCUMENTS

| EP | 1 566 744 A1 | 8/2005 |
| EP | 1 566 751 A1 | 8/2005 |
| WO | WO 2004/025504 | * 3/2004 |

OTHER PUBLICATIONS

EPO Communication and Search Report, dated Jul. 5, 2005 (8 pages).
Bernstein et al., "Concurrency Control and Recovery in Database Systems, Two Phase Locking," Concurrency Control and Recovery in Database Systems, Reading, Addison Wesley, US, pp. 47-111, 1987, Document No. XP002270716.
Gray et al., "Transaction Processing Concepts and Techniques (excerpt), Passage," Transaction Processing: Concepts and Techniques, pp. 373-445, 1993, Document No. XP002322153.

(Continued)

*Primary Examiner*—Sam Rimell
(74) *Attorney, Agent, or Firm*—Finnegan, Henderson, Farabow, Garrett, & Dunner, L.L.P.

(57) ABSTRACT

Methods and systems are provided for locking data objects. According to one implementation, a method is provided that comprises automatically selecting, with a lock service module whether a) logical locks for the data objects are set when changes of the data objects are requested, or b) logical locks for the data objects are set when the first or each further processing module is started or c) no logical locks for the data objects are set when processing the data objects.

18 Claims, 6 Drawing Sheets

OTHER PUBLICATIONS

Read, "SAP-Datenbankadministration mit Microsoft SQL Server 2000, Passage," Galieo Press GMBH, Germany, 2002, pp. 19-42, Document No. XP002332114.

Roman Rapp, U.S. Appl. No. 11/292,117, entitled "Methods, Computer Systems and Software Applications for Providing a Central Lock Service," filed Dec. 2, 2005.

Anonymous, "Das SAP Sperrkonzept (BC-CST-EQ) Release 4.6C," Publication of SAP AG, [Online] Apr. 2001, pp. 1-38; retrieved from the Internet: URL:http://www.consolut.de/saphelp/deutscha/BCCSTEQ/BCCSTEQ_PT.pdf, retrieved on Apr. 6, 2006.

Gray, J. et al., "Transaction Processing: Concepts and Techniques (excerpt), Passage," Transaction Processing: Concepts and Techniques, 1993, pp. 373-445.

Mohan, C., "Interactions Between Query Optimization and Concurrency Control," Research Issues on Data Engineering, 1992: Transaction and Query Processing, Second International Workshop, Tempe, AZ, Feb. 2-3, 1992, IEEE Computer Society, Feb. 2, 1992, pp. 26-35.

Anonymous, "BC—ABAP Dictionary Release 4.6C," SAP Software Documentation, [Online] Apr. 2001, pp. 1-8, and 214-230; retrieved from the Internet: URL:http://help.sap.com/printdocu/core/Print46c/de/data/pdf/BCDWBDIC/BCDWBDIC.pdf, retrieved on Mar. 7, 2006.

Anonymous, "ABAP Programmierung (BC-ABA) Release 4.6C," SAP Software Documentation, [Online] Apr. 2001, pp. 1-16, and 1359-1391; retrieved from the Internet: URL:http://help.sap.com/printdocu/core/Print46c/de/data/pdf/BCABA/BCABA.pdf, retrieved on Mar. 7, 2006.

Read et al., "Sap Architektur," SAP Datenbank-Administration MIT Microsoft SQL Server 2000, Galileo Press, 2002, pp. 19-42.

PCT International Search Report and Written Opinion for PCT/EP2005/056484 (14 pages).

PCT International Search Report and Written Opinion for PCT/EP2005/056483 (12 pages).

* cited by examiner

METHODS, COMPUTER SYSTEMS AND SOFTWARE APPLICATIONS FOR PROVIDING A LOCK SERVICE

CROSS REFERENCE TO RELATED APPLICATION(S)

This application claims the benefit of priority to U.S. Provisional Patent Application No. 60/632,526 entitled, "Methods, Computer Systems and Software Applications for Providing a Lock Service," filed Dec. 3, 2004, the disclosure of which is expressly incorporated herein by reference to its entirety.

TECHNICAL FIELD

The technical field of the present invention is in the area of electronic data processing. More particularly, the invention relates to methods, computer program products and systems for data locking.

BACKGROUND INFORMATION

A database management system is usually equipped with a special lock mechanism that synchronizes access to data on the database. The purpose of the lock mechanism is to prevent two transactions from changing the same data on the database simultaneously.

Locks may be defined generically as "lock objects". A lock entry is a specific instance of a lock object and locks a certain database object, such as a correction or a table entry or a file or a whole table.

Locks are usually set and deleted automatically when user programs access a data object and release it again.

When interactive transactions are programmed, locks may be set and released by calling specific function modules.

The tables in which data records should be locked with a lock entry are defined in a lock object together with their key fields. When tables are selected, one table (the primary table) is first selected. Further tables (secondary tables) can also be added using foreign key relationships, for example.

The lock argument of a table in the lock object may consist of the key fields of the table. The lock argument fields of a lock object may be used as input parameters in the function modules for setting and removing locks generated from the lock object definition. When these function modules are called, the table entries to be locked or unlocked are specified by defining certain values in these fields. These values can also be generic or wildcards. The lock argument fields, therefore, define which subset of the table entries should be locked.

A simple case of a lock object comprises of exactly one table and the lock argument of the table is the primary key of this table. Several tables can also be included in a lock object. A lock entry, therefore, can lock an entire logical object, and not only a record of a table. Such a logical object can be, for example, a document comprising an entry in a header table and N entries in a position table.

Further, a lock mode may be assigned for each table in the lock object. This mode may define how other users can access a locked record of the table. The lock mode controls, for example, whether several users can access data records at the same time. The lock mode can be assigned separately for each table in the lock object. When the lock is set, the corresponding lock entry is stored in the lock table of the system for each table.

Access by more than one user can be synchronized in the following ways:

Exclusive Lock: The locked data can only be displayed or edited by a single user. A request for another exclusive lock or for a shared lock is rejected.

Shared Lock: More than one user can access the locked data at the same time in display mode. A request for another shared lock is accepted, even if it comes from another user. An exclusive lock is rejected.

Exclusive But Not Cumulative: Exclusive locks can be requested several times from the same transaction and are processed successively. In contrast, exclusive but not cumulative locks can be called only once from the same transaction. All other lock requests are rejected.

It is possible to synchronize access by several programs to the same data with a logical lock mechanism having two main functions: A program can tell other programs which data records it is just reading or changing. A program can prevent itself from reading data that is just being changed by another program.

Data records of a table to be locked may also be defined by a logical condition. When a lock is set, for example, this logical condition is entered in a lock table. This entry is retained until it is removed by the program or the program comes to an end. All the locks set by a program are thus removed at the end of the program.

When accessing data records, the records being edited by other programs may be identified by the entry in the lock table. Such an entry for the lock may define a number of fully specified key fields. That is, either a value is passed for the key field or this field is locked generically by means of a wildcard.

In a multi-user system environment, as is frequently the case in enterprise business software and computer system enivornments, data that is being processed by one user has to be locked, so that a second user can not change it at the same time. This is essential to avoid data inconsistencies.

Usually, the data is being locked via a key of the processed data (e.g., a document number, cost center ID). However, business transactions that process a lot of data at the same time (e.g., the costing of a car with several thousand components or the evaluation of a value flow net between many cost centers, activities and cost objects) can not lock every single piece of data via its key, since the number of locks that can be set is restricted because of limited hardware resources. For instance, a reasonable number of locks per transaction may be around 50 for larger multi-user systems. Anything more could harm the performance of the system. This is especially true, if several hundreds or thousands of users work at the same time setting locks in the system.

Thus, mass transactions such as those described above can not lock every single piece of data (e.g., every product number or cost center ID). Instead, wildcards are typically used in a lock entry so that it affects several single keys and many pieces of data can be locked via one entry (so-called "generic locking").

Wildcards, however, have to be used with care. Otherwise, too much data may be locked and other users can't continue with their tasks since they can't access needed data. For instance, during the calculation of a product with 100 sub-products, one can not lock all products by only having a wildcard in the lock entry for the product. Otherwise, other users could not run a costing of an independent product.

Another example of a lock mechanism in a multi-user system environment is presented in the following document: READ, Paul: "SAP-Database Administration with Microsoft SQL Server 2000," Galieo Press GmbH, Germany, pages 19–42 (2002). The document discloses a locking mechanism in a SAP/R3 system. As presented therein, a lock server (enqueue-server) administers logical locks in a lock table stored in the main memory of an application server. In that lock table, logical locks are set on a transaction level, whereas in the database management system (DBMS), the database locks are activated on a record level. During runtime, an application sends a lock requests to the lock server, which queries the lock table for an entry in conflict with the lock request. If such an entry is found, the lock server rejects the lock request and sends a message to the user. If no conflicting entry is found, the lock server confirms the lock request and the application performs/stores the transaction, thereby locking the respective data objects via the DBMS.

In a highly dynamic and analytical working environment dealing with many data objects, none of the solutions mentioned above might be the only optimal one. It depends on how many users work with the data and how often objects are changed.

Furthermore, when working with data in a change mode, every object change has to request a lock first. This costs time and might be annoying for users wanting to go quickly through some data changes.

Thus, there is a need for improved methods, software applications and/or data processing systems that can provide a more efficient solution to one or more of the problems described above. Furthermore, it is desirable to provide a mechanism for locking data more efficiently.

The above description is based on the knowledge of the present inventors and not necessarily that known in the art.

SUMMARY OF THE INVENTION

In accordance with embodiments of the invention, as embodied and broadly described herein, methods and systems are provided for processing data objects in a computer system. In one embodiment, a method is provided for locking one or more of the data objects by means of a database management system. The method comprises: receiving, with a lock service module, a request from a first data processing module to set one or more logical locks one or more data objects to limit access of further data processing modules to the one or more data objects; and automatically selecting, with the lock service module, whether a) the logical locks on the data objects are to be set when changes of the data objects are requested, or b) the logical locks on the data objects are to be set when the first or each further data processing module is started, or c) no logical locks are to be set on the data objects.

In case a selection is made according to a) or b), the method may further comprise trying, with the lock service module, to set logical locks on the one or more data base objects according to the selection, and sending, with the lock service module, a message on the success and/or failure of logically locking the data objects to the one data processing module.

The method may also comprise sending, in case a selection is made according to c), a corresponding message from the lock service module to the one data processing module. In addition, the method may comprise processing, in case a) and b), the successfully locked data objects with the one data processing module, and processing, in case c), all data objects with the one data processing module. As disclosed herein, when updating the data objects in the database, the database management system may perform the locking of the data objects in the database.

A "lock service module" is hereinafter alternatively referred to as central lock service (CLS).

Embodiments of the invention may be utilized to install a central lock service on a computer system, which may be implemented as one or more software modules running in the "background" and which manage data locking for one or more applications running on the computer system. This can provide full flexibility and allow optimization of the performance of the applications. For example: one or more applications may have their own CLS or one CLS may be available for a plurality of applications.

Methods and systems consistent with the invention can be used to optimize the locks in a central way and, thus, replace all existing ones, which can lead to a better maintainability of the system.

As an example, it might be helpful to already lock all data when starting an application, even if not every single object will be changed.

In cases where it can be made sure that during the application flow two different users never work with the same data (e.g., because they work with different plants, versions or other key entities), the logical locking mechanisms consistent with the present invention may be turned off to improve performance.

Embodiments of the invention are further directed to computer systems, computer programs, computer readable media and carrier signals, each comprising program code or instructions of locking data objects in a computer system according to the inventive methods and embodiments disclosed herein.

Such computer program can be installed as one or more programs or program modules on different hardware systems (computers or computer systems), and run separately and independently of each other, in their entirety being capable of performing the inventive methods and embodiments disclosed herein. In one embodiment, the different systems may be connected in the form of a network to communicate with each other.

Additional objects and advantages of the various embodiments of the invention will be set forth in part in the description, or may be learned by practice of the invention, as claimed herein. The objects and advantages of the embodiments of the invention will be realized and attained by means of the elements and combinations particularly pointed out in the appended claims. Embodiments of the invention are disclosed in the detailed description section and in the appended independent and dependent claims.

The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate exemplary embodiments of the invention and, together with the description, explain the principles of the invention. In the drawings.

DESCRIPTION OF THE EMBODIMENTS

Within the concept of this specification, the terms used shall have their usual meaning in the context of the field of data processing unless defined otherwise. Particularly, a "computer system" broadly refers to any stand alone computer, such as a PC or a laptop or a series of computers connected via a network, e.g. a network within a company, or a series of computers connected via the internet. Computer systems and programs may be closely related. As used herein, phrases, such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system.

The first and/or each further application may be any application running on a computer system and accessing data objects for read or write or delete or move operations.

In this context, the term "automatically" is not intended to exclude a user's interactions with the computer system in the course of processing.

Further, within the concept of this specification, the term "step" shall be interpreted broadly. This means that the term is intended to refer not only to a single action or command, but also to a plurality of actions or commands, or program modules or the like.

The disclosed methods as described herein may be implemented by means of computer system(s) and computer software, which allows the creation of business software applications and which allows the use of databases or database applications and Internet applications.

A lock object may be implemented as on or more lines of one or more tables in a database, such as a relational database. In object oriented programming languages, a lock object may be implemented as an instance of a class. The terms "database locks" and "physical locks" are used alternatively and both broadly refer to locks using the primary keys of every single affected data base table. The term "logical locks" broadly refers to locks using one or more parts of keys of one or more tables or to locks using logical conditions in a lock table or, more generally, to locks not set by a database management system. If not "locking" is not expressly related to a database/physical lock, the terms "locking" and "lock" refer to logical locks.

The term "data object" broadly refers to any data in a database, which is identified by a key.

The functionality of "selecting" may be implemented by, for example, querying entries in data fields or data objects, e.g. flags, followed by corresponding program branching.

According to one embodiment of the invention, a further module for generating logical locks may be available in addition to the lock service module. The latter is hereinafter alternatively referred to as "central lock service" (CLS), and the further module is hereinafter alternatively referred to as "lock server" or "enqueue server". As disclosed herein, the lock server may generate the logical locks upon request from a central lock service.

The central lock service may be called under various conditions. For example, consistent with one embodiment of the invention, the central lock service may be called, when: a) an application is being started and knowing the data it will use (e.g. load of a working environment), or b) a single or several objects in the application is requested to be changed (e.g. manual change or calculation of a network of cost flows), or c) the application releases and/or commits data changes (saving of a working environment). As input data for cases a) and b), the names of the m key fields of the n data objects to be changed may be provided to the central lock service.

According to a further embodiment, the inventive method as described above may be characterized in that the method further comprises in case mode a) is active: selecting whether a1) a single locking is to be used or a2) a generic locking is to be used.

The term "single lock mechanism" herein broadly refers to the general known mechanism of locking single records.

The term "generic lock mechanism" herein broadly refers to range locking, for example, by means of wildcards in key fields to specify primary key prefixes or by means of logical conditions.

In a further embodiment, the generic lock mechanism is used if more than a pre-settable number of locks are to be set.

According to another embodiment, the method comprises sending, with the lock service module, messages on the success and/or failure of locking the data objects to the one data processing module. Information on success and failure may be received from a lock server.

A still further embodiment comprises the lock service module providing a buffer, in which information on locked data objects are stored. This information may be copies of logical locks generated by the lock service.

In the case of a single lock mechanism or otherwise, the internal buffer may be implemented as a table that keeps a list of all locked objects, e.g. by storing key fields of the locked objects. The lock service module (CLS) can, thus, check in its own buffer, if an object was already locked. This can be more efficient than sending the lock request to a further module, e.g. the lock server.

A further embodiment is characterized in that the settings are configurable per application and/or per user.

Another embodiment relates to a method that comprises: receiving, with the lock service module, names of one or more (m) key fields of the one or more data objects to be locked; receiving, with the lock service module, n values for each of the m key fields of n data objects to locked; and receiving, with the lock service module, a maximum number (k) of locks to lock the n data objects. Further, the method may comprise checking, with the lock service module whether n<=k and (i) in case yes, creating one or more lock objects comprising the m names and n values for the m key fields, and (ii) in case no, querying the n values of the m key fields and determining numbers (y1 to ym) of different values (Val_1.1 to Val_m_ym) of the key fields 1 to m. The lock service module may determine consecutively from a first to i-th field where i <=m until y1* . . . *yi>=k and, in case the condition is satisfied, create one or more lock objects comprising the names of the key fields 1 to m and values Val_1.1 to Val_(i-1)·y(i-1) for the key fields 1 to i-1 and comprising wildcards for the remaining key fields.

A further embodiment consistent the invention comprises determining one or more common characteristics of different values of a key field for the remaining key fields and writing the determined common characteristics and one or more wildcards into the remaining key fields of the or each lock object. A common characteristic may be a character string consisting of one or more consecutive characters of the characters forming the value. For example, in values like A1BC123, A2BC234, "A" and "BC" are common characteristics. Thus, A3BC345 may be replaced by A?BC*. In this case "?" is a wildcard for a single character, "*" is a wildcard for any number of characters.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, embodiments of the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Figure 1:
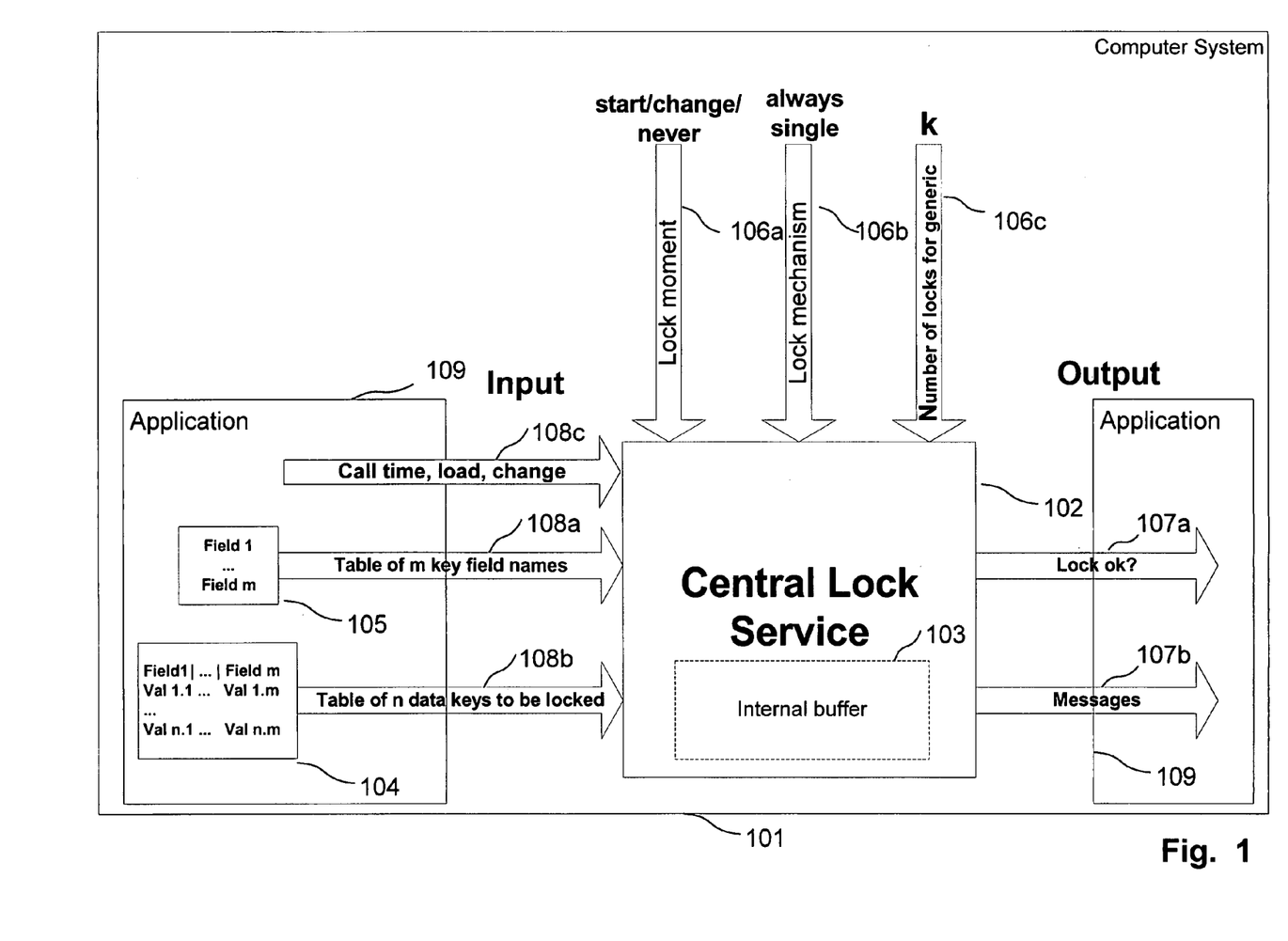
FIG. 1 illustrates an exemplary computer system and implementation of input/output data for a central lock service, consistent with an embodiment of the invention.

Reference will now be made in detail to the principles of the invention and its embodiments by an explanation on the basis of a data processing process, examples of which are illustrated in the accompanying drawings Referring now to FIG. 1, a diagram is provided for illustrating an exemplary computer system 101 and a software module 102 representing the central lock service module (CLS), in accordance with an embodiment of the present invention. In the embodiment of FIG. 1, time proceeds from left to right.

A first processing module, e.g. software application 109, may send a request comprising request information 108a, 108b, 108c for locking a number of n data objects as input data to the CLS 102. The request part 108a may comprise a table 105 including the names of m key fields of the data objects subjected to the lock request. Request part 108b may comprise values val.1.1 to val.n.m of the m key fields for the n data objects. Depending on pre-settable rules 106a, the CLS 102 may select using built-in logic, how the lock request has to be proceeded. Set 106a provides conditions under which locking is started immediately after receiving the lock request or shortly before changes are made on the data objects or whether the data objects are not logically locked at all for the particular request. In a further embodiment, a further set 106b provides conditions under which a single lock mechanism or a generic lock mechanism is applied. In one embodiment, a further set 106c provides a minimum number k of the n data objects, which has to be exceeded if a generic lock mechanism has to be applied.

All sets 106a, 106b, 106c may be different for different applications 109 sending the lock request and/or for different users using the applications 109. Information for these decisions may be stored in tables accessed by the central lock service 102.

After logically locking/not logically locking the data objects, the lock service returns information 107a, e.g. a flag, whether the requested locks could be done. The "?" in information 107a indicates that the CLS may give the answer to this question as yes or no. If the logical locks could not be set, it returns information 107b, such as a table of explaining messages, for example, saying that requested objects were already logically locked by another user.

In a further embodiment, the central lock service 102 may optionally hold an internal buffer table 103 of the already logically locked single objects, preferably for the single lock mechanism. Thus, if the application tries to lock the same object again (e.g., because a user changes it a second time during one online session), the service may, for performance reasons, first check via its buffer if the lock is already done.

The reaction of the central lock service may depend on the settings, e.g. the call moment for the requested lock, what is pointed out below in more detail.

Figure 2:
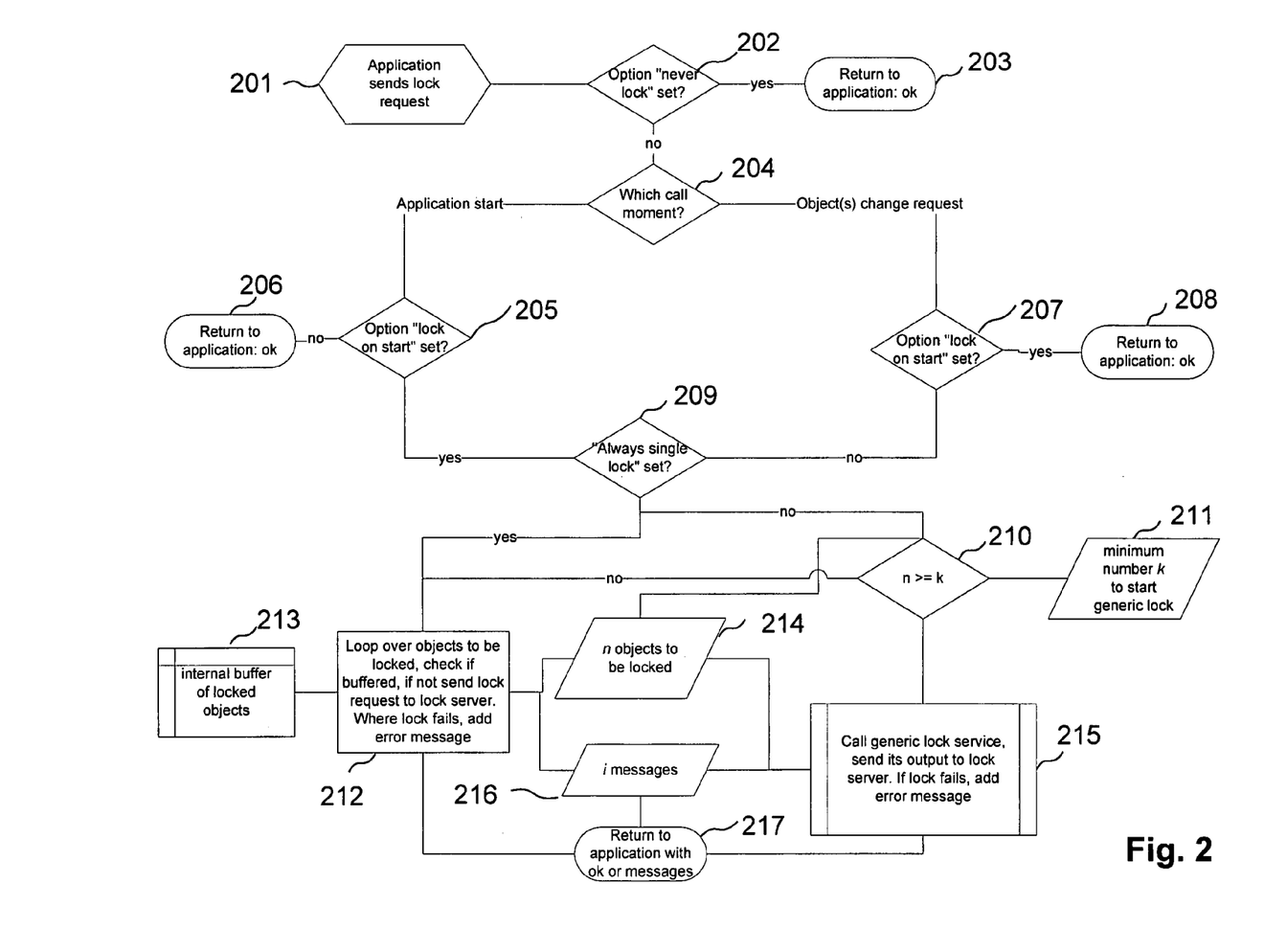
FIG. 2 is a flow diagram of an exemplary method for implementing a central lock service, consistent with an embodiment of the invention.

Referring now to FIG. 2, a further embodiment of the invention is illustrated by way of a flow diagram of an exemplary method, which includes steps performed in the course of a lock request.

In a first step 201, application 109 sends a lock request comprising information 108a,b,c to the central lock service module 102. In a step 202, module 102 checks, by querying preset flags for example, whether an option "never lock" 106a has been set. If this option has been set, a confirmation is sent back to application 109 in step 203 and the lock request is terminated. If the option has not been set, the lock request process branches in a step 204, depending on the moment and whether the lock request has been sent. If the lock request has been set when application 109 has been started, it is checked in step 205 whether an option "lock on start" 106a has been set or not. In case this option has not been set, a confirmation is sent back to application 109 in step 206 and the lock request is terminated. If this option has been set, the lock process continues with step 209. If, in step 204, it turns out, for example by evaluating information 108a,b,c received from the application, that the lock request has been sent in the course of processing data objects, wherein changes have to be made on such objects, it is checked in step 207 of an other branch of the lock request process, whether the option "lock on start" 106a has been set or not. If this option has been set, a confirmation is sent back to application 109 in step 208 and the lock request is terminated. If this option has not been set, the look process continues with step 209. In step 209 it is checked, whether an option "always single lock" 106b has been set or not. If this option has been set, every data object to be locked has to be locked by a single lock and the process continues with step 212, in which step it is first checked, by querying an internal buffer 213, in which information on already logically locked data objects are stored, whether or which of the data objects, which are requested to be locked in the current look request process, are already locked. The number n of data objects to be locked may be taken e.g. from a data object 214, which may be part of the information 108a,b,c.

For the data objects, which are not yet locked, a lock request may be sent to a lock server. The lock server then returns confirmation messages, if the data objects could be logically locked, or error messages, if the locks failed. These messages 107a,b are then returned to application 109 in a step 217. The messages may be stored in a data object 216, which then is passed to application 109.

Figure 4:
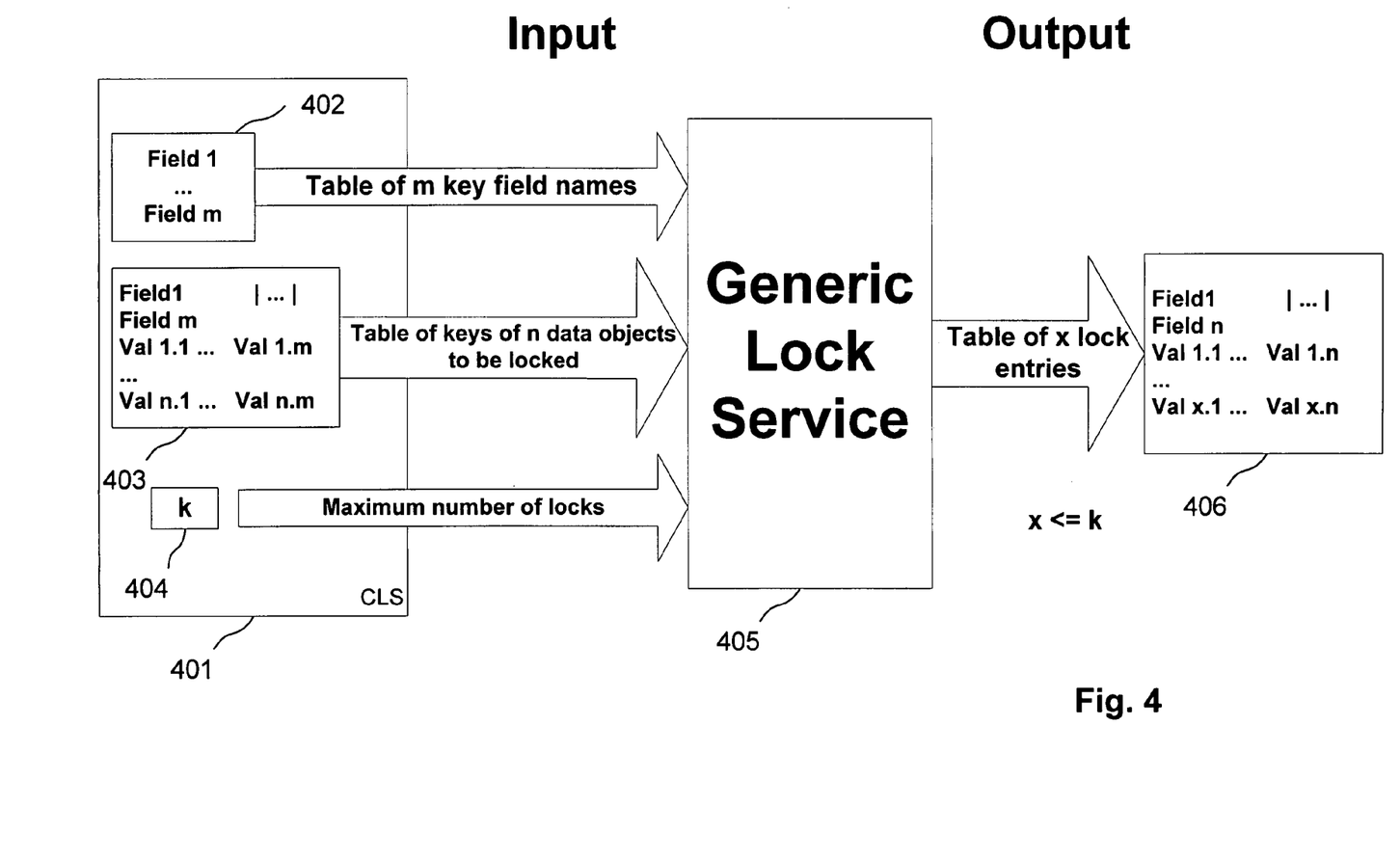
FIG. 4 is a block diagram that illustrates the possible interactions between program modules and data, consistent with an embodiment the invention.
Figure 5:
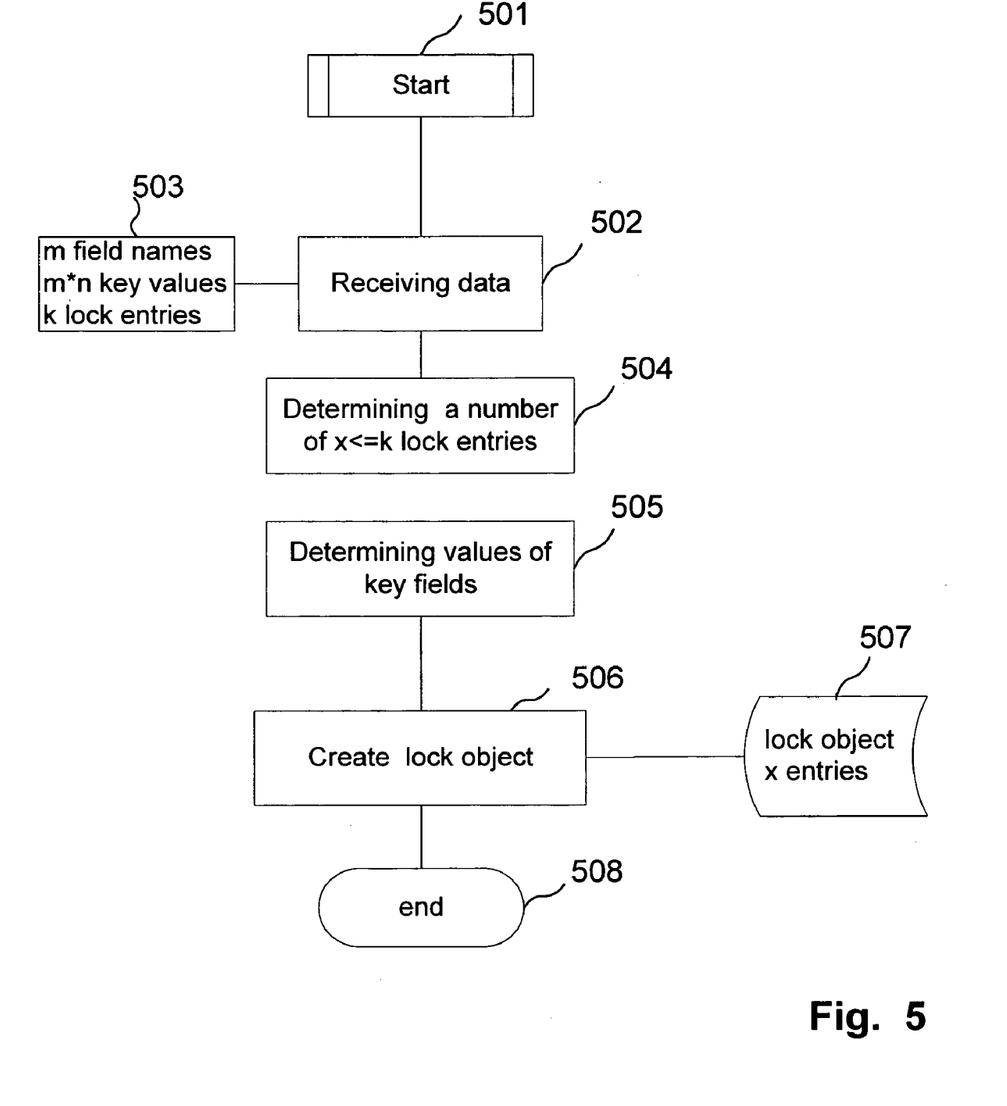
FIG. 5 is a flow diagram for illustrating an exemplary of method, consistent with an embodiment of the invention.

If, in step 209, the check revealed that the option "always single lock" has not been set, it is checked in a step 210, whether the number n data objects to be locked, is larger or equal than a minimum number k, 106c in FIG. 1, required for starting a generic lock service 215, which in turn is described in more detail in FIGS. 4 and 5 and the respective description. The number k may be taken from a data object 211, which may be part of the generic lock service 215 or of general settings of the system. If n is smaller than k, the process continues with step 212 described above. In the other case, the generic lock service 215 is called to generate data for setting logical locks for the data objects by means of wild cards. The generic lock service 215 may generate a lock object or, alternatively, may sent the generated data to a lock server (not shown) to generate the locks or the lock object. The generic lock service 215 returns confirmation messages or error messages, which are returned to application 109 in termination step 217, as already described above.

If the application 109 releases changes, it informs the central lock service, so all corresponding existing logical locks from that application, including the ones in the internal buffer, can be deleted.

Figure 3:
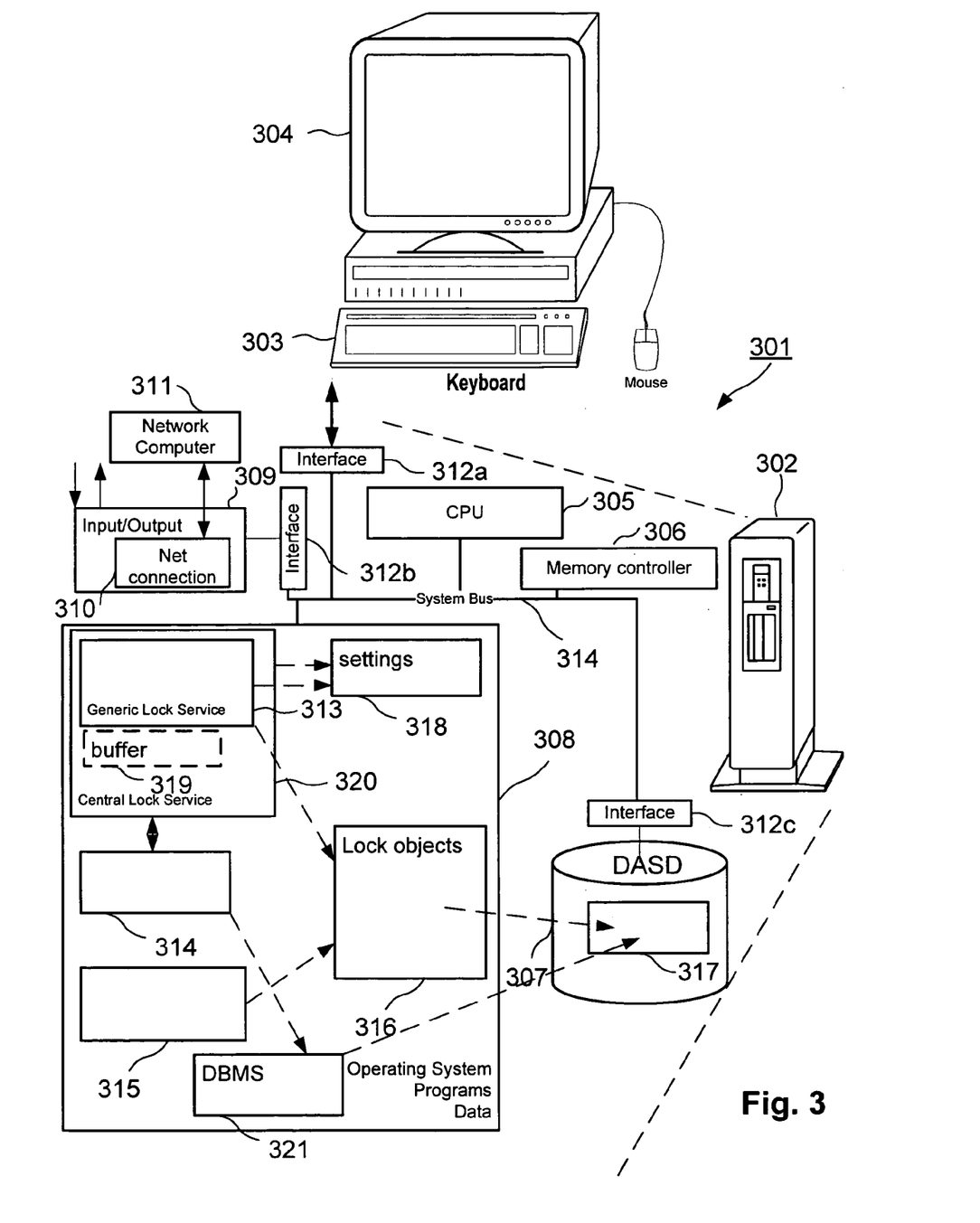
FIG. 3 is a block diagram for illustrating an exemplary implementation of a computer system, consistent with an embodiment of the invention.

Referring now to FIG. 3, an exemplary computer system 301 is illustrated that comprises a computer 302 and operating means 303, 304, in accordance with an embodiment of the present invention. Those skilled in the art will appreciate that the disclosed methods and systems of the present invention apply equally to any computer system, regardless of whether the computer system is a complicated multi-user computing apparatus or a single user device such as a personal computer or workstation.

Computer 302 may comprise a processor 305, a main memory 308, a memory controller 306, an auxiliary storage interface 312c, a general input/output interface 312b and a terminal interface 312a, all of which are interconnected via a system bus 314. Note that various modifications, additions, or deletions, such as the addition of cache memory or other peripheral devices, may be made to computer system 301 illustrated in FIG. 3 within the scope of the present invention. Thus, FIG. 3 is presented to simply illustrate some of the salient features of computer system 301.

Processor 305 may perform computation and control functions of computer system 301, and comprise a suitable central processing unit (CPU). Processor 305 may comprise a single integrated circuit, such as a microprocessor, or may comprise any suitable number of integrated circuit devices and/or circuit boards working in cooperation to accomplish the functions of a processor. Processor 305 may execute computer programs within main memory 308, such as object-oriented programs.

Auxiliary storage interface 312c may be adapted to allow computer system 301 to store and retrieve information from auxiliary storage devices, such as magnetic disk (e.g., hard disks or floppy diskettes) or optical storage devices (e.g., CD-ROM). One suitable storage device is a direct access storage device (DASD) 307. As shown in FIG. 3, DASD 307 may be a hard disk drive which may read programs and data from a hard disk. It is important to note that while embodiments of the present invention are described in the context of a fully functional computer system, those skilled in the art will appreciate that the mechanisms and features of the present invention are capable of being distributed as a program product in a variety of forms, and that the present invention applies equally regardless of the particular type of signal bearing media to actually carry out the distribution. Further examples of signal bearing media include: recordable type media such as floppy disks and CD ROMS, and transmission type media such as digital and analogous communication links, including wireless communication links.

Memory controller 306, through use of a processor, may be responsible for moving requested information from main memory 308 and/or through auxiliary storage interface 312c to processor 305. While for the purposes of explanation, memory controller 306 is shown as a separate entity, those skilled in the art will understand that, in practice, portions of the function provided by memory controller 306 may actually reside in the circuitry associated with processor 305, main memory 308, and/or auxiliary storage interface 312c.

Terminal interface 312a may allow system administrators and computer programmers to communicate with computer system 301, normally through monitor 304, keyboard 303, mouse, trackball and the like or through programmable workstations. Although the system 301 depicted in FIG. 3 contains only a single main processor 305 and a single system bus 314, it should be understood that the present invention applies equally to computer systems having multiple processors and multiple system buses. Similarly, although the system bus 314 of the further embodiment is a typical hardwired, multi-drop bus, any connection means that supports directional communication in a computer-related environment could be used.

Input/output interface 312b may allow computer system 301 via processor 305 to communicate with general input/output means 309, including a network connection 310, for sending and/or receiving data, e.g. for a network connection with one or more further computer systems 311, or for sending or receiving of data to or from other parties. A plurality of computer systems like computer system 301, can be connected via the network connection 310 in the form of a network. In such a case, the network computers 311 can be used as further input/output means, including the use as further storage locations.

Memory 308 may include an operating system, programs and data, particularly a central lock service module 320, a lock service module 313 (generic lock service) each having access to configurable settings 318, a first processing module 314 capable of sending a lock request to the central lock service 320, a further data processing module 315, and a lock object 316 for logically locking data objects of a database 317 available in DASD storage 307. In yet another embodiment, the CLS 320 comprises an internal buffer 319 for storing information on already locked data objects, e.g. copies of the lock object(s)/locks 316.

It should be understood that for purposes of this application, "memory" 308 is used in its broadest sense, and can include Dynamic Random Access Memory (DRAM), Static RAM (SRAM), flash memory, cache memory, etc. While not explicitly shown in FIG. 3, memory 308 may be a single type of memory component or may be composed of many different types of memory components. For example, memory 308 and CPU 305 may be distributed across several different computers that collectively comprise system 301. It should also be understood that programs in memory 308 can include any and all forms of computer programs, including source code, intermediate code, machine code, and any other representation of a computer program.

The operating system may provide the basic functionality that controls the computer system 301. Operating system can comprise any suitable operating system, such as IBM's OS/400, OS/2, Microsoft's Windows, Java and the various flavors of UNIX. Database 317 may provide a mechanism for persistently storing data objects and object data in the computer system 301. It can be any suitable database, such as a relational database like those available from IBM, Oracle or Microsoft. Database 317 may also provide a standard database locking mechanism, which may be used by applications 314, 315 when committing/updating the processed data objects.

Those skilled in the art will appreciate that more than one of the mentioned processors may work in parallel in a computer system.

Referring now to FIG. 4, a further embodiment of the invention is illustrated. The embodiment comprises a central lock service module 401, a generic lock service 405 and a lock object 406, which may be located in a main memory of a computer system, like the one shown in FIG. 3. Before accessing one or more data objects in a database, a processing module passes the names of m key fields 402 of the n data objects to be locked, a table 403 of the values of the key fields for the n data objects to be locked and a number 404 of the maximum number of locks (here k) to the central lock service 401. Central lock service 401 then, in the course of the process, transfers the data to generic lock service 405. Thereby, the names of the key fields are preferably in an order, which fits to the structure of the data base and the data objects to be locked. After processing the received data, generic lock service 405 generates a lock object 406 having x<=k entries for the n data objects. The entries comprise values for the x*m key fields that are used to lock the n data objects. If n is smaller or equal than k, a table (lock object) is returned, which comprises the n*m values of the n*m key fields, since the number of data keys does not exceed the possible number of locks and all data objects can be locked with their full key. Otherwise, if n greater than k, wildcards are used to lock several values for one key field at once. To determine where to use the wildcards, the generic lock service 405 may use a heuristic method to optimize the locks. According to such a heuristic method, generic lock service 405 may first collect all values that appear per key field. This may be implemented by means of a table as shown by Table 1:

TABLE 1

Internal table of key field values

| Key Field | Number of different values | Value |
|---|---|---|
| Field 1 | Y1 | Val 1.1 |
| | | ... |
| | | Val 1.y1 |
| ... | ... | ... |
| Field m | Ym | Val m.1 |
| | | ... |
| | | Val m.ym |

In Table 1, the first column contains the names of the key fields 1 to m. The second column contains a number y1 to ym of different values contained in the respective key field. The third column contains the different values val_1.1 to val_m.ym of the key fields 1 to m. Therefore, a field per key field is subdivided into a number of ym sub fields for a field m. The generic lock service 405 may then loop over the key fields and check, whether the number yi (i->1 to m) of different values is smaller than k. If yes, all the values for this key can be locked, if not, all key values are locked per wildcard. The process may continue that way with the next key field considering, that the number of created lock entries is the product of the number of values per key field, which must not exceed k (k<=y1* . . . *ym).

In a further embodiment, Table 1 may be sorted according to ascending or descending values yi before the loop described above is performed.

The following tables show, by way of non-limiting example, how a lock object could look like. In particular, the example consists of a Table 2 defining m=3 key fields 1 to 3, and a Table 3 defining keys of n=18 data objects to be locked and a maximum number of k=10 locks.

TABLE 2

Names of key fields

| Field no | Name |
|---|---|
| 1 | Controlling Area |
| 2 | Activity |
| 3 | Branch |

TABLE 3

Keys of data objects to be locked

| Controlling Area | Activity | Branch |
|---|---|---|
| 1000 | Open Account | A1 |
| 1000 | Open Account | A2 |
| 1000 | Open Account | A3 |
| 1000 | Open Account | A4 |
| 1000 | Open Account | A5 |
| 1000 | Open Account | A6 |
| 1000 | Open Account | A7 |
| 1000 | Open Account | A8 |
| 1000 | Open Account | A9 |
| 1000 | Close Account | A1 |
| 1000 | Close Account | A2 |
| 1000 | Close Account | A3 |
| 1000 | Close Account | A4 |
| 1000 | Close Account | A5 |
| 1000 | Close Account | A6 |
| 1000 | Close Account | A7 |
| 1000 | Close Account | A8 |
| 1000 | Close Account | A9 |

These data are passed to the generic lock service 405 by processing the module via central lock service 401. After receipt, generic lock service 405 creates an internal table, for example, Table 4) in order to determine a balanced number of locks containing wildcards.

TABLE 4

Internal table of key field values

| Key Field | Number of different values | Value |
|---|---|---|
| Controlling Area | 1 | 1000 |
| Activity | 2 | Open Account |
| | | Close Account |
| Branch | 9 | A1 |
| | | A2 |
| | | A3 |
| | | A4 |
| | | A5 |
| | | A6 |
| | | A7 |
| | | A8 |
| | | A9 |

Generic lock service 405 then checks, whether n is smaller or equal than k. Since this is not the case in the example, generic lock service 405 loops over Table 4 starting with field 1: The number of values for that field is smaller than 10 and therefore, all values for that field can be locked. Continuing with field 2, generic lock service 405 calculates the maximum number of lock entries for fields 1 and 2, which is 2, what is still smaller than 10 and therefore, all values for fields 1 and 2 can be locked. Continuing with field 3, the analogous calculation yields a maximum number of 18 lock entries, what is greater than 10, and therefore, the values for field 3 can not be locked and are replaced by wildcards. Consequently, generic lock service 405 creates a lock object having to entries. This can be seen in Table 5: the lock object comprises a table with a column for each key field. The values of key fields 1 and 2 are entered in the respective fields, whereas the values of the key field 3 is replaced by a wildcard (**). As result, the 18 data objects in the database represented by the keys in table 3, are locked with a lock object having two entries. Thus, the activities open/close account would be locked in controlling area 1000 for all branches. If a second process should try to get access to data objects with those activities and controlling area part in branches B1 to B2, for example, this would not be possible, because the wildcards cover these branches as well.

TABLE 5

Lock object having 2 entries

| Controlling Area | Activity | Branch |
|---|---|---|
| 1000 | Open Account | ** |
| | Close Account | ** |

This situation may be improved, consistent with another embodiment of the invention, by determining common characteristics of different values of a key field and entering the determined common characteristics together with a wildcard into the key fields. This will now be explained in more detail by way of continuation of the preceding example.

When checking for common characteristics of the values of the key field 3, generic lock service 405 finds that the character 'A' is a common characteristic of all values of key field 3. This character can now be combined with a wildcard and the combination can be entered in state of the mere wildcard into the fields of key field 3. The result is shown in Table 6.

Now a second process could have access to those activities in the branches B1 to B9 at the same time.

TABLE 6

Lock object having 2 complete entries in the first 2 key fields and a common characteristic together with a wildcard in the remaining key field

| Controlling Area | Activity | Branch |
|---|---|---|
| 1000 | Open Account | A* |
| | Close Account | A* |

Referring now to FIG. 5, a further embodiment of the invention is illustrated by way of a flow diagram, which summarizes processing steps of an exemplary method for a generic lock service. After a starting step 501, the generic lock service receives data from a data processing module 503 via a central lock service module in step 502. The data comprise m field names, m*n values of key fields for the n data objects to be locked and a maximum number of k lock entries. The generic lock service then determines in a step 504 an optimized number of x<=k lock entries, for example by creating and evaluating an internal table like table 4 described before. The generic lock service then determines in a step 505 whether values or wildcards are entered into the fields of the x entries of a lock object 507 to be created in step 506. The process then returns to step 502 and waits for a new lock request or ends in a step 508.

Figure 6:
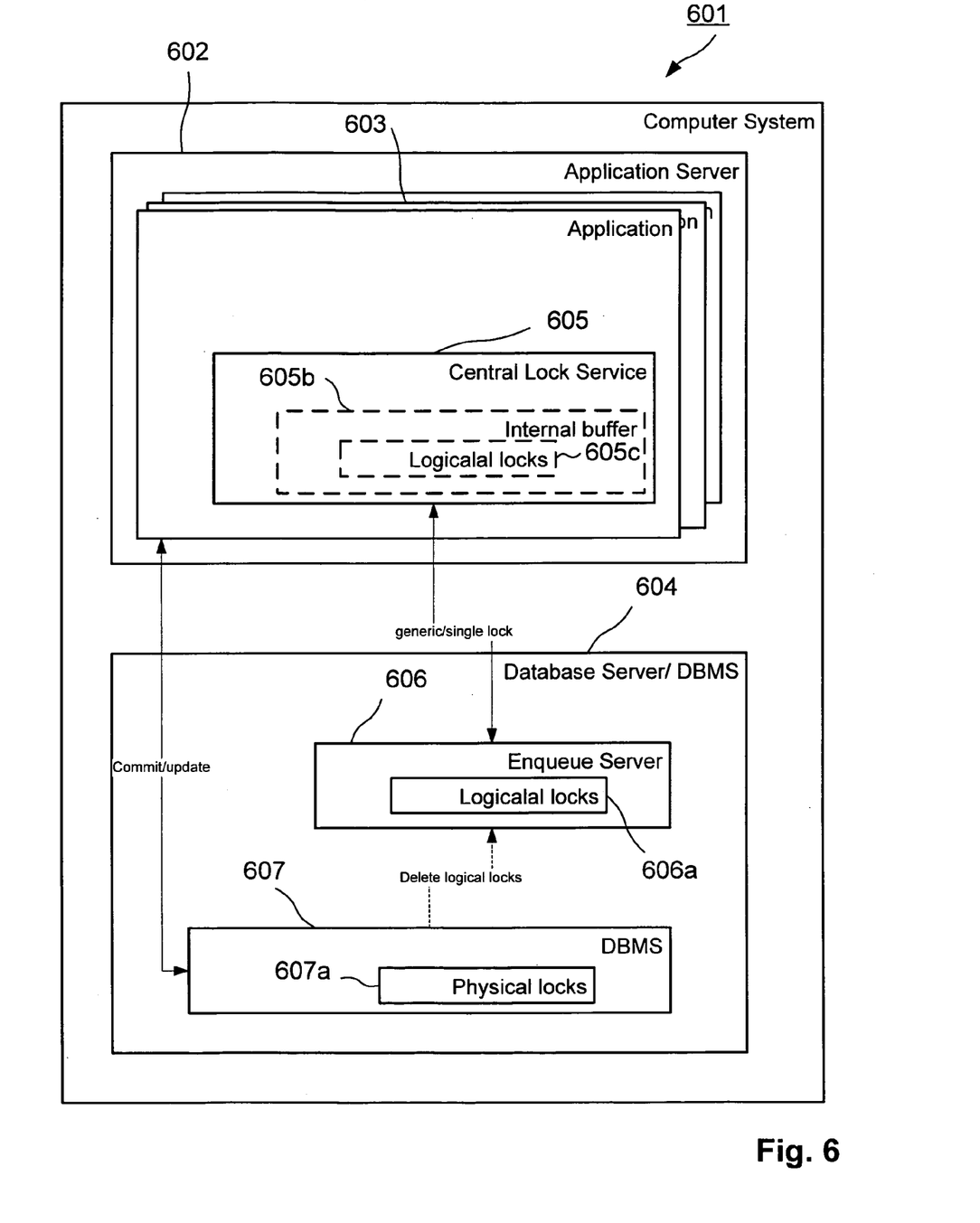
FIG. 6 is a block diagram for illustrating a further example of an embodiment of the central lock service, consistent with an embodiment of the invention.

Referring now to FIG. 6, a further embodiment of the invention is illustrated that includes an exemplary computer system 601 comprising an application server 602 and a database server 604 with a database management system (DBMS). Both servers may be connected via a network. One or more data processing modules (applications) 603 and one or more lock service modules (Central Lock Service, CLS) 605 may be running/installed on the application server 602, each application 603 having one lock service module 605. In an alternative embodiment, one lock service module 605 may be designed to be available for all applications 603. A lock server 606 (enqueue server) is running/installed on the database server 604.

During runtime, one of the applications 603, which may for example be a single transaction, sends a lock request to the central lock service 605. The central lock service selects the conditions for the setting of the logical locks as pointed out above and sends a corresponding request for logical locks to the lock server 606. The lock server 606 tries to set/generate the logical locks 606a according the selection and returns a message on the success and/or failure of setting the logical locks 606a to the central lock service 605, which in turn forwards it to the application 603. Application 603 then further processes the data objects on which logical locks 606a could be successfully set. When physically updating/committing the data objects in the database, the DBMS creates physical locks 607a for the requested data objects.

As a result, the selection of the central lock service 605 that no logical locks are set has the meaning that all data objects, for which the application has requested a logical lock, can be processed. Then, application 602 may perform a read and/or write operation on the data objects in the database. If the operation was successful, the DBMS 607 releases the DBMS locks 607a.

The application sends a corresponding message to the central lock service 605 to delete the logical locks 606a on the data objects. The central lock service 605 then sends a corresponding request to the lock server 606.

In an alternative embodiment, the application 603 may wait for a confirmation of the release of the locks 607a by the DBMS 607 before requesting the deletion of the logical locks 606a.

In a further alternative embodiment, the DBMS 607 may directly delete the logical locks 606a in the lock server 606. In a still further embodiment, the central lock service 605 comprises an internal buffer 605b, in which copies 605c of the logical locks 606a are stored. In this case, only logical locks held in that buffer of the central lock service 605 have to be deleted via a request of the application 603 to the central lock service 605.

Modifications and adaptations of the present invention will be apparent to those skilled in the art from consideration of the specification and practice of the embodiments of the invention disclosed herein. The foregoing description has been presented for purposes of illustration and description. It is not exhaustive and does not limit the invention to the precise forms disclosed. Modifications and variations are possible in light of the above teachings or may be acquired from the practicing of the disclosed embodiments of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer readable media, such as secondary storage devices, for example, hard disks, floppy disks, or CD-ROM; the Internet or other propagation medium; or other forms of RAM or ROM.

Computer programs based on the written description and flow charts of embodiments of the invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to the various embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for providing a data object locking service in a computer system, the method comprising:
receiving, with a lock service module, a request from a first data processing module to set one or more logical locks on one or more data objects to limit access of further data processing modules to the one or more data objects;
automatically selecting, with the lock service module, whether a) the logical locks on the data objects are to be set when changes of the data objects are requested, or b) the logical locks on the data objects are to be set when the first or each further data processing module is started, or c) no logical locks are to be set on said data objects;
in case a selection is made according to a) or b), trying, with the lock service module, to set logical locks on the one or more data objects according to the selection and sending a message on the success or failure of logically locking the data objects to the first data processing module;
in case a selection is made according to c), sending, with the lock service module, a corresponding message to the first data processing module;
in case a) or b), processing the successfully locked data objects with the one data processing module;
in case c), processing all data objects with the first data processing module;
when updating the data objects in a database, a database management system performs the locking of the data objects in the database; and
storing a list on a computer-readable medium indicating which, if any, of the data objects are locked.

2. The method of claim 1, further comprising:
in case mode a) or b) is selected, automatically selecting with the lock service module whether a single record locking is to be used, or a generic range locking is to be used for setting the logical locks.

3. The method of claim 1, further comprising:
providing a buffer in which information on logically locked data objects is stored.

4. The method of claim 2, wherein the selections are made by querying configurable settings, the settings being configurable per application or per user.

5. The method of claim 1, further comprising:
receiving, with the lock service module, names of one or more (m) key fields of the one or more data objects to be locked;
receiving, with the lock service module, n values for each of the m key fields of n data objects to locked;
receiving a maximum number (k) of logical locks for the n data objects;
checking, with the lock service module, whether $n<=k$ and in case yes, creating one or more lock objects comprising the m names and n values for the m key fields and in case no, querying the n values of the m key fields and determining numbers (y1 to ym) of different values (Val_1.1 to Val_m.ym) of the key fields 1 to m; and determining consecutively from a first to i-th field where i<=m until y1* ... *yi>=k and, in case the condition is satisfied, creating one or more lock objects comprising the names of the key fields 1 to m and values Val_1.1 to Val_(i–1)·y(i–1) for the key fields 1 to i–1 and comprising wildcards for the remaining key fields.

6. The method of claim 5, further comprising:
determining one or more common characteristics of different values of a key field for the remaining key fields and writing the determined common characteristics and one or more wildcards into the remaining key fields of each lock object.

7. A computer system comprising:
a memory having program instructions;
input means for receiving and entering data;
output means for sending and presenting data;
a database management system comprising a lock mechanism for locking data objects in a database;
storage means for storing data;
a processor responsive to the program instructions, the program instructions comprising a lock service module and a plurality of data processing modules, the program instructions configured to enable the processor to perform operations according to a method, the method comprising:
receiving, with a lock service module, a request from a first data processing module to set one or more logical locks on one or more data objects to limit access of further data processing modules to the one or more data objects;
automatically selecting, with the lock service module, whether a) the logical locks on the data objects are to be set when changes of the data objects are requested, or b) the logical locks on the data objects are to be set when the first or each further data processing module is started, or c) no logical locks are to be set on said data objects;
in case a selection is made according to a) or b), trying, with the lock service module, to set logical locks on the one or more data objects according to the selection and sending a message on the success or failure of logically locking the data objects to the first data processing module;
in case a selection is made according to c), sending, with the lock service module, a corresponding message to the first data processing module;
in case a) or b), processing the successfully locked data objects with the one data processing module;
in case c), processing all data objects with the first data processing module; and
when updating the data objects in a database, a database management system performs the locking of the data objects in the database.

8. The computer system of claim 7, wherein the method further comprises:
in case mode a) or b) is selected, automatically selecting with the lock service module whether a single record locking is to be used, or a generic range locking is to be used for setting the logical locks.

9. The computer system of claim 7, wherein the method further comprises:
providing a buffer in which information on logically locked data objects is stored.

10. The computer system of claim 8, wherein the selections are made by querying configurable settings, the settings being configurable per application or per user.

11. The computer system of claim 7, wherein the method further comprises:
receiving, with the lock service module, names of one or more (m) key fields of the one or more data objects to be locked;
receiving, with the lock service module, n values for each of the m key fields of n data objects to locked;
receiving a maximum number (k) of logical locks for the n data objects;
checking, with the lock service module, whether n<=k and in case yes, creating one or more lock objects comprising the m names and n values for the m key fields and in case no, querying the n values of the m key fields and determining numbers (y1 to ym) of different values (Val_1.1 to Val_m.ym) of the key fields 1 to m; and
determining consecutively from a first to i-th field where i<=m until y1* ... *yi>=k and, in case the condition is satisfied, creating one or more lock objects comprising the names of the key fields 1 to m and values Val_1.1 to Val_(i–1)·y(i–1) for the key fields 1 to i–1 and comprising wildcards for the remaining key fields.

12. The computer system of claim 11, wherein the method further comprises:
determining one or more common characteristics of different values of a key field for the remaining key fields and writing the determined common characteristics and one or more wildcards into the remaining key fields of each lock object.

13. A computer-readable medium comprising program instructions for performing a method, the method comprising:
receiving, with a lock service module, a request from a first data processing module to set one or more logical locks on one or more data objects to limit access of further data processing modules to the one or more data objects;
automatically selecting, with the lock service module, whether a) the logical locks on the data objects are to be set when changes of the data objects are requested, or b) the logical locks on the data objects are to be set when the first or each further data processing module is started, or c) no logical locks are to be set on said data objects;
in case a selection is made according to a) or b), trying, with the lock service module, to set logical locks on the one or more data objects according to the selection and sending a message on the success or failure of logically locking the data objects to the first data processing module;
in case a selection is made according to c), sending, with the lock service module, a corresponding message to the first data processing module;
in case a) or b), processing the successfully locked data objects with the one data processing module;
in case c), processing all data objects with the first data processing module; and
when updating the data objects in a database, a database management system performs the locking of the data objects in the database.

14. The computer-readable medium of claim 13, wherein the method further comprises:
in case mode a) or b) is selected, automatically selecting with the lock service module whether a single record locking is to be used, or a generic range locking is to be used for setting the logical locks.

15. The computer-readable medium of claim 13, wherein the method further comprises:

provide a buffer in which information on logically locked data objects is stored.

16. The computer-readable medium of claim 14, wherein the selections are made by querying configurable settings, the settings being configurable per application or per user.

17. The computer-readable medium of claim 13, wherein the method further comprises:

receiving, with the lock service module, names of one or more (m) key fields of the one or more data objects to be locked;

receiving, with the lock service module, n values for each of the m key fields of n data objects to locked;

receiving a maximum number (k) of logical locks for the n data objects;

checking, with the lock service module, whether n<=k and in case yes, creating one or more lock objects comprising the m names and n values for the m key fields and in case no, querying the n values of the m key fields and determining numbers (y1 to ym) of different values (Val_1.1 to Val_m.ym) of the key fields 1 to m; and determining consecutively from a first to i-th field where i<=m until y1* ... *yi>=k and, in case the condition is satisfied, creating one or more lock objects comprising the names of the key fields 1 to m and values Val_1.1 to Val_(i−1)·y(i−1) for the key fields 1 to i−1 and comprising wildcards for the remaining key fields.

18. The computer-readable medium of claim 17, wherein the method further comprises:

determining one or more common characteristics of different values of a key field for the remaining key fields and writing the determined common characteristics and one or more wildcards into the remaining key fields of each lock object.

* * * * *